United States Patent
Kari et al.

(10) Patent No.: US 6,603,738 B1
(45) Date of Patent: Aug. 5, 2003

(54) PRIORITIZATION OF DATA TO BE TRANSMITTED IN A ROUTER

(75) Inventors: Hannu H Kari, Veikkola (FI); Sami Huusko, Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/155,201

(22) PCT Filed: Mar. 24, 1997

(86) PCT No.: PCT/FI97/00187
§ 371 (c)(1),
(2), (4) Date: Dec. 23, 1998

(87) PCT Pub. No.: WO97/36405
PCT Pub. Date: Oct. 2, 1997

(30) Foreign Application Priority Data

Mar. 25, 1996 (FI) .................................................. 961363

(51) Int. Cl.[7] .............................................. H04L 12/56
(52) U.S. Cl. ..................... 370/230.1; 370/232; 370/412
(58) Field of Search ............................... 370/230, 231, 370/232, 234, 235, 236, 252, 253, 412, 413, 415, 417, 230.1, 468, 477

(56) References Cited

U.S. PATENT DOCUMENTS

| | | | | |
|---|---|---|---|---|
| 5,499,238 A | * | 3/1996 | Shon .......................... | 370/399 |
| 5,896,386 A | * | 4/1999 | Johnston ..................... | 370/466 |
| 5,970,062 A | * | 10/1999 | Bauchot ...................... | 370/345 |
| 5,996,019 A | * | 11/1999 | Hauser et al. .............. | 709/235 |
| 6,240,066 B1 | * | 5/2001 | Nagarajan et al. .......... | 370/230 |

FOREIGN PATENT DOCUMENTS

| | | |
|---|---|---|
| EP | 407 161 | 1/1991 |
| WO | 93/19551 | 9/1993 |
| WO | 93/19559 | 9/1993 |
| WO | 95/32570 | 11/1995 |

OTHER PUBLICATIONS

Globecom 95, vol. 3, Nov. 14, 1995, chakraborty, "Mobile Multimedia : In Contex to ATM Transport and GMS/GPRS Mobile Access Network" pp. 1937–41.

Digital Cellular Telecommunications System (Phase 2t), Global System for Mobile Communications, TS 02.60 V5.0.0 (Feb. 1997) pp. 1–47.

Digital Cellular Telecommunications System (Phase 2t), Global System for Mobile Communications, GSM 03.60 v5.1.0 (Oct. 1997) pp. 1–90.

* cited by examiner

*Primary Examiner*—Min Jung
(74) *Attorney, Agent, or Firm*—Pillsbury Winthop LLP

(57) ABSTRACT

General Packet Radio Service is a new service designed for digital mobile systems. Because of bottlenecks, such as an air interface (Um), queues may be formed in routers. Long transmissions of data may slow the operation of interactive applications so that it is no longer sensible to use the applications. In the routers, separate queues are formed for each service, quality of service, connection, subscriber and/or application/application class. Quality of service can be indicated by providing each packet with an identity indicating the quality, or a change in the quality can be signalled as separate messages. The amount of data sent from a queue at one go may be controlled primarily based on quality of service of the subscriber. When packets are sent from a queue, it is monitored whether only a small number of packets remains in the queue, and if so, these packets are sent as well.

16 Claims, 2 Drawing Sheets

PRIORITIZATION OF DATA TO BE TRANSMITTED IN A ROUTER

This application is the national phase of international application PCT/FI97/00187 filed Mar. 24, 1997 which designated the U.S.

BACKGROUND OF THE INVENTION

Field of the Invention

The invention relates to queue management during routing of data packets.

FIG. 1 shows the parts of a mobile system that are essential to the invention. Mobile Stations MS communicate with Base Transceiver Stations BTSn over an air interface Um. The base transceiver stations are controlled by Base Station Controllers BSC associated with Mobile Switching Centres MSC. A subsystem controlled by a base station controller BSC, including the base transceiver stations BTS controlled by the system, is called a Base Station Subsystem BSS. The interface between the exchange MSC and the base station subsystem BSS is called an A-interface. The part of the A-interface in the mobile system that is on the side of the exchange MSC is called a Network Subsystem NSS. The interface between the base station controller BSC and the base transceiver station BTS, in turn, is called an Abis-interface. The mobile switching centre MSC connects incoming and outgoing calls. It has similar functions as an exchange of a Public Switched Telephone Network PSTN. In addition to these, it also performs functions that are typical of mobile communication only, such as subscriber location management, in co-operation with the subscriber registers of the network, which are not shown separately in FIG. 1.

A standard radio connection used in digital mobile systems is a circuit-switched connection, which means that resources allocated to a subscriber are reserved for the connection concerned for the entire duration of the call. A General Packet Radio Service GPRS is a new service designed for digital mobile systems, such as the GSM system. The packet radio service is described in ETSI specifications TC-TR-GSM 02.60 and 03.60. The packet radio service makes it possible to offer the user of a mobile station MS a packet-form radio connection effectively utilizing radio resources. On a packet-switched connection, radio resources are reserved only when speech or data is to be sent. The speech or data is collected in packets of a certain length.

When a packet like this has been transmitted over the air interface Um, and the transmitting party does not immediately have a new packet to send, the radio resource can be released to other subscribers.

The system of FIG. 1 comprises a separate Serving GPRS Support Node or SGSN, which controls the operation of the packet data service on the network side. The control comprises, for example, logging of the mobile station on and off the system, location updating of the mobile station, and routing of the data packets to the correct destination. In the present application, 'data' is interpreted widely to mean any information transmitted in a digital mobile system, for example speech encoded in digital form, data transmission between computers, or telefax data. An SGSN node can be in connection with a base transceiver station BTS, a base station controller BSC or a mobile switching centre MSC, or it may be separate from them. The interface between an SGSN node and a base station controller BSC is called a Gb-interface.

Information, such as control signalling and speech or other data is transmitted in the packet network by GPRS frames. Each frame F comprises a header 1 and a data part 2. In order that the system would know which mobile station has sent the frame, the header 1 comprises an identity identifying the mobile station, for example a Temporary Logical Link Identity TLLI. When a mobile station registers in the GPRS network, the network gives the mobile station a TLLI identity for use during the GPRS connection. After the GPRS connection, the same TLLI identity can be reassigned to some other mobile station.

In the header 1, it is also sometimes possible to use a Network Layer Service access point Identity NLSI as well as the TLLI identity to indicate the application protocol used by the mobile station.

In a packet radio network it is possible to imagine a situation in which a subscriber using a personal computer PC communicates with another computer 14 through a packet network 10, data network 11, router 13 and a local area network LAN. A long data transmission or several short consecutive data transmissions are in progress between the computers PC and 14, for example in accordance with Internet FTP protocol. Simultaneously, the user of the computer PC or some other subscriber initiates an interactive session, for example in accordance with the Internet Telnet protocol. If the packet of each interactive session had to wait at the nodes along the connection for the termination of the long data transmission, then the response times would grow so long in the interactive session that it would no longer be sensible to use the service.

The basic idea in many known queue management mechanisms is that short tasks in a queue can be prioritized over long tasks. When the short tasks are transferred to the beginning of the queue, the average waiting time is shortened. As, an illustrative example for this can be given a queue that comprises 10 tasks with a duration of 1 unit and 1 task with a duration of 10 units. The average value of the waiting times (before the task is started) is 13.2 units if the long task is performed first. If the long task is performed last, the average waiting time is only 5 units.

The problem with the application of the queue management system in the packet radio system is that in the packet radio system no mechanisms are defined by which a short task can be distinguished from a long task. It is not possible to conclude from an incoming packet how many packets of the same application will be arriving after the packet concerned.

In addition, the packet radio network sets certain requirements that do not occur in all queuing systems. One such requirement is that the packets of one and the same user belonging to one and the same application must be sent on the FIFO (First In First Out) principle. Later arriving packets must usually not be prioritized over earlier packets of the same application and the same user. Another requirement is that the operation of not a single application of even one user must be interrupted for so long that the application sets down the connection.

The object of the invention is thus to provide a method and an equipment implementing the method so that the above problems associated with queuing in the packet radio network can be solved. The objects of the invention are achieved by a method that is characterized by what is stated in claim 1. The preferred embodiments of the invention are claimed in the dependent claims.

The basis of the invention is that at least two queues are formed at a node of a packet network, a packet arriving at the node is conducted to a queue on the basis of at least one subscriber-specific criterion and/or service-quality-specific criterion, and a predefined number of packets is sent from the queues to the destination at one go.

Further, different queues can be given different priorities on the basis of the subscriber, terminal equipment, application, quality of service, and the amount of data contained in the queue. All the while it is observed that the service of any queue is not interrupted for so long that the application would set down the connection.

In the present application, 'queue' means any arrangement by which the same effect is achieved as by physical placement of packets in different queues. With regard to the use of memory, it may be more economical to keep only pointers relating to the packets in different queues. A queue can be implemented, for example, as a chained list in which each element of the list contains a pointer pointing to the next and/or previous element.

Since the packets of interactive sessions can be prioritized over the packets belonging to long data transmissions, the response times of the interactive connections are shortened and the service is sensible to use even when other applications are operating on the background.

An arriving packet can be conducted to a queue assigned to it on the basis of a subscriber-specific and/or quality-of-service-specific criterion. The subscriber-specific criteria include, for example:

A subscriber/terminal equipment to which the packet concerned is addressed. The subscriber can also be identified on the basis of a TLLI identity or network address, such as an IP address, of the connection. Formation of a separate queue for each user ensures that a newly registered user can start using the services relatively quickly.

A transport layer process (e.g. TCP) that can be identified on the basis of the identity of a TCP session. The procedure makes it possible to support applications that open several TCP connections simultaneously, e.g. one connection for each picture of a WV page.

The quality-of-service-specific criteria include, for example:

The Quality of Service QoS of a receiving subscriber. The GPRS specifications define four different qualities of service. On the basis of the quality of service, it is possible to ensure that the packets of the critical applications can be transmitted within the maximum time defined by the specifications.

The application or application class that can be identified on the basis of the port of a TCP protocol. By separating from one another different applications, such as FTP, Telnet and WWW, one can ensure that interactive applications need not wait for any long data transmissions to be terminated first.

The applications can be separated one by one, or the applications can be divided into different application classes that differ from one another with respect to the service quality requirements, e.g. with respect to the greatest delay allowed. From the queues with the highest quality of service, packets can be sent immediately. The subscribers can also be divided into different quality classes. Prioritization can be effected so that separate queues are formed for the data on the basis of each criterion. From each queue, a certain amount of data is sent on the FIFO principle. Data is then sent from the next queue, and so on. The amount of data transmitted at one go can be set such that each queue with one and the same quality of service is given an equal amount of transmission time in each transmission turn. Alternatively, the same number of packets can be sent from each such queue, whereby the subscribers are offered service of the same quality even though the connection of one subscriber may be poorer than that of another.

The amount of data transmitted at one go can also be regulated on the basis of the data located in the queue so that more packets are sent from queues with many packets than from shorter queues. It is also possible to monitor the service that has been given to each queue earlier, for example by maintaining a moving average of time for the time the packets are in the queue. The average of time is to be maintained constant for each queue with the same quality of service by serving better a queue that has been offered service of a quality below the average. At the same time, it is monitored that the operation of not a single user and/or a single application is interrupted for so long that the application would set down the connection.

If the division is made entirely on the basis of the subscriber or the terminal equipment, the data packet of each new connection is assigned a queue of its own, and so it is not placed at the back of a single long queue like in the case of one common queue. In this kind of division made entirely on the basis of a subscriber-specific or connection-specific identity (e.g. TLLI identity), however, problems arise if one and the same subscriber starts simultaneously more than one application requiring different service. For example, the subscriber may be transmitting a large amount of data by the FTP protocol and let the transmission continue as background processing when he starts an interactive session, such as a TELNET session. Because of the FTP session, the queue of the subscriber concerned may already contain large quantities of data, and so the response times in the interactive session may become unduly long.

SUMMARY OF THE INVENTION

In a preferred embodiment of the invention, the problem is solved by improving the division so that a separate queue is formed for each application type and/or each TCP process. This improves the operability of the applications requiring short response times as compared with the simple embodiment described above. If, for example, TELNET can be identified as a unique application or application class on the basis of the TCP protocol and a unique queue is assigned to it, the data packets of the TELNET application can be prioritized over packets of the same user located in the queue of the FTP session.

Prioritization can be further improved by controlling the amount of data sent from each queue at one go. If the division into queues is based on the subscriber identity, the amount of data sent at one go can be defined on the basis of the subscriber's quality of service. The quality of service is negotiated as the subscriber registers to use the GPRS network or possibly also during the session. If the subscriber's quality of service has a high priority, a larger amount of data is sent from a queue like this at one go than from a queue with a low priority. The subscriber with a higher quality of service is thus offered better service, and the operability of his applications is improved. Further, the queues with the highest priority can be processed immediately, whereas those with other priorities are processed in turns. If the division is based on the application or TCP process and it is detected that a certain queue contains a relatively small amount of data, all the remaining data can be transmitted at one go, whereby the application or the TCP process need not wait for a small amount of data so as to be able to terminate the task. Here the transmission of the last few packets of a queue hardly slows the other queues at all, and yet it clearly improves the operation of the application or TCP process concerned, since any extra delay is eliminated.

BRIEF DESCRIPTION OF THE DRAWINGS

In the following the invention will be described in greater detail by means of preferred embodiments and with reference to the attached drawings, in which.

DETAILED DESCRIPTION OF THE INVENTION

Figure 1:
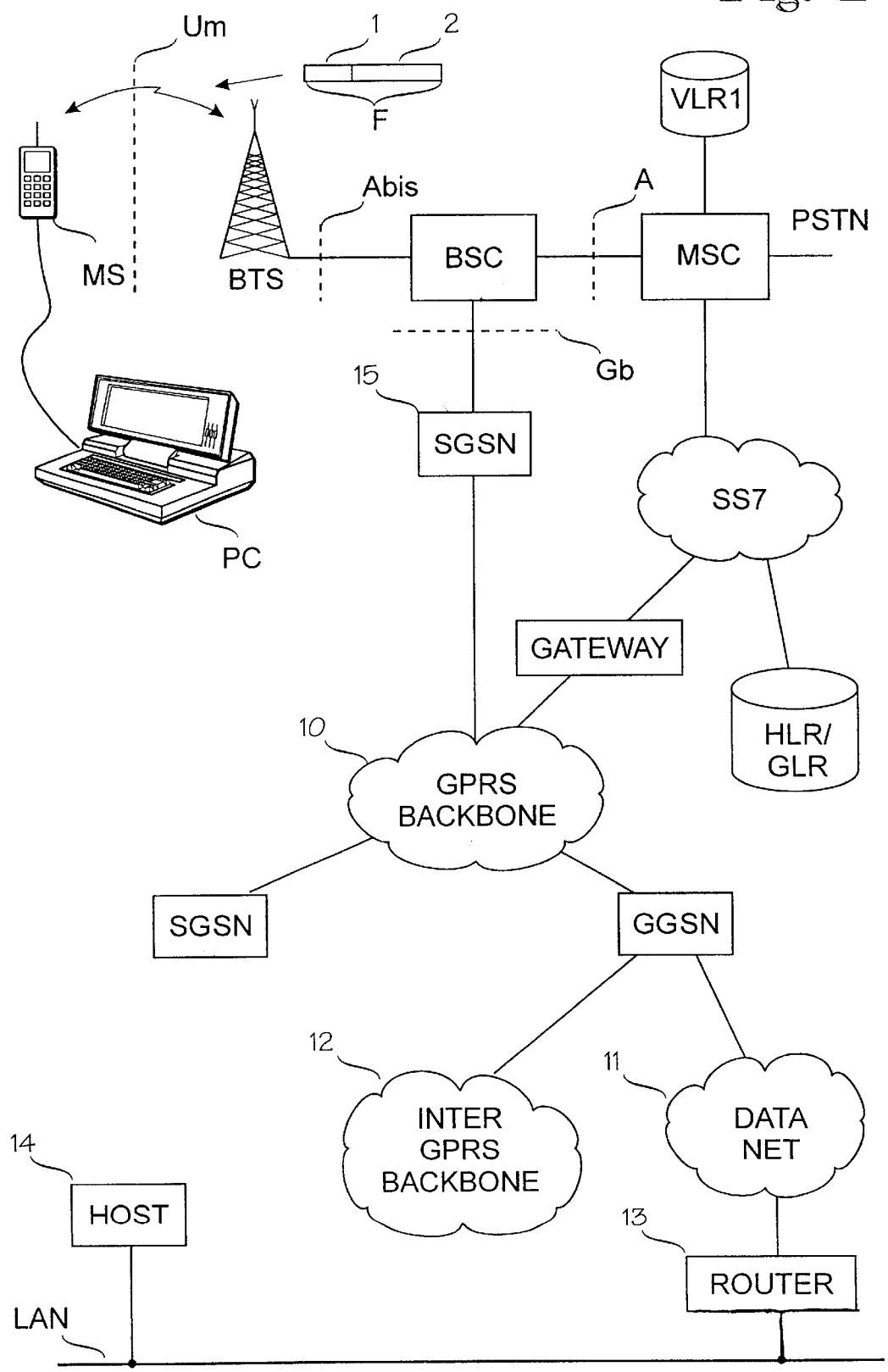
FIG. 1 shows the parts of a mobile system that are essential to the invention.
Figure 2:
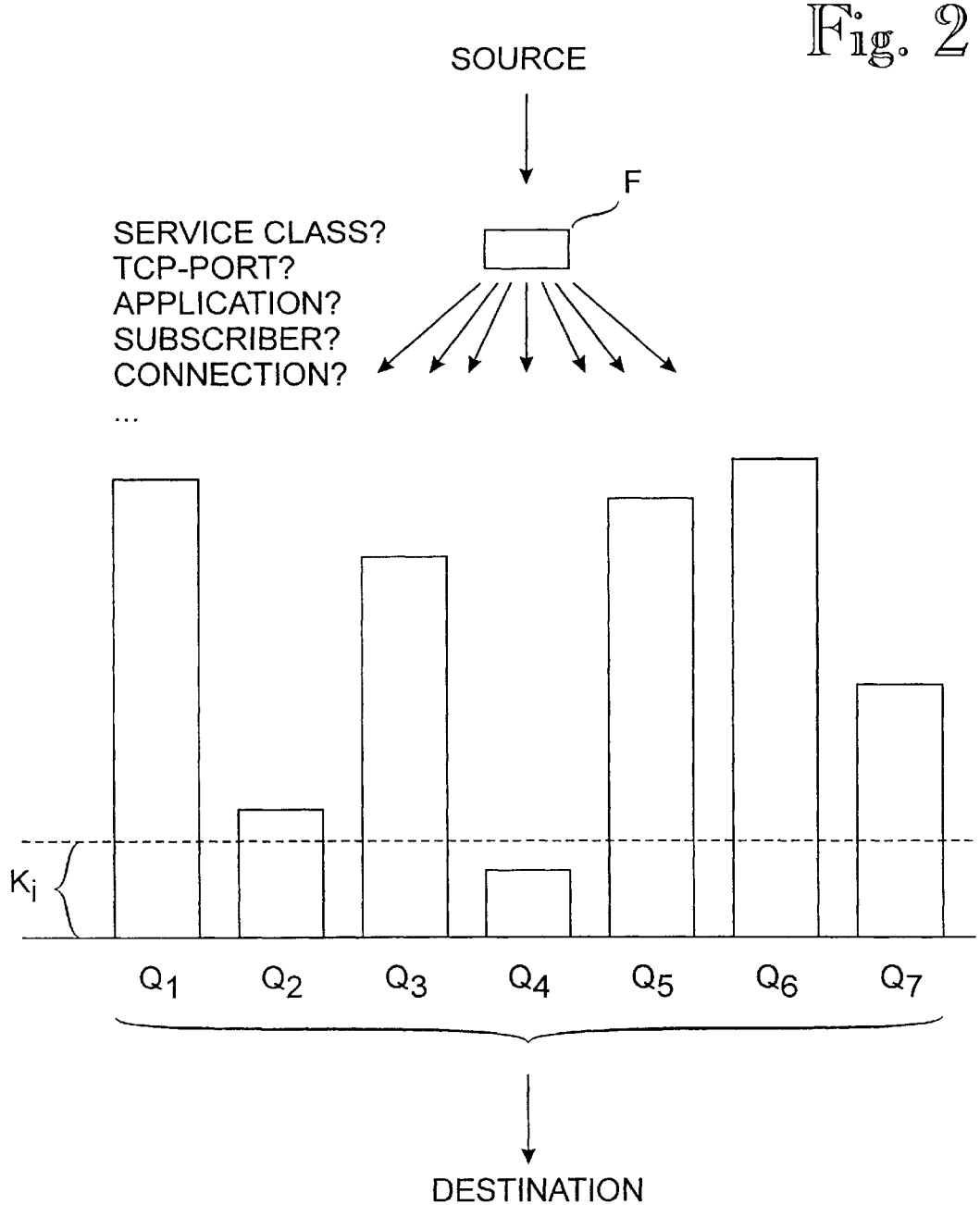
FIG. 2 illustrates packet management by means of queues.

As shown in FIGS. 1 and 2, a support node SGSN 15 in a packet network functions as a router and buffers data in a queue, forwarding it through a base station system BSC-BTS to a mobile station MS and a computer PC connected to it. Since an air interface Um forms a clear bottleneck, a queue is formed at the SGSN node 15. If all the data buffered in the SGSN node 15 is kept in a single FIFO queue, especially interactive applications, such as Telnet and WWW, which transmit often but small amounts of data at a time, will suffer. Correspondingly, queues may form at a Gateway GPRS Support Node GGSN, since the GGSN is a gateway between a GPRS network and some other type of network, such as Internet.

The subscriber can be identified on the basis of an TLLI identity sent in a header 1 of a frame F. The TLLI identity identifies each connection between the mobile station and the SGSN node. The application can be identified unambiguously on the basis of a port number of a TCP protocol. Since TCP processes are also separate entireties, they too can be distinguished from each other. Each GPRS subscriber can be identified when the parameters of the subscriber are checked from a GPRS register or some other such database.

In a preferred embodiment of the invention, queues Qi are formed in a router on the basis of a subscriber-specific identity and application class. When a new subscriber registers in a system, his data is assigned a queue of its own. When the subscriber then starts several applications at the same time, a separate queue is provided for each simultaneous application. The advantage of the arrangement is that an application performing a long data transmission can function on the background without interfering unduly with any interactive application started after it. Even here, the amount of data transmitted at one go can depend on the subscriber's quality of service, the quality of service of the application and/or the amount of data in the queue.

A packet radio can be used in critical tasks. For example, the International Union of Railways IUR requires that at the highest priority, a 128-byte message is transmitted in less than 0.5 seconds. To achieve this rate, special measures must be taken. When the quality of service QoS is negotiated—i.e. as a mobile station registers as a user of the services offered by the GPRS network, or possibly even later during the session—the new quality of service is signalled to the routers of the GPRS packet network. When the SGSN node 15 receives a packet to an address of the Public Switched Packet Data Network PSPDN that has a high-priority quality of service, the SGSN node conducts the packet to a high-priority queue.

The quality of service can be signalled to the routers on the packet network e.g. by providing each packet with a code indicating the quality of service. Since in the GPRS specifications four alternative qualities of service are defined, it is possible to identify them by two bits. Alternatively, the new quality of service can be signalled by a separate message indicating a change in the quality of service, the message being sent to a router located somewhere along the connection. The router will store the changed quality of service in its memory.

When each packet is provided with a code indicating the quality of service, each node along the connection can make the decisions concerning priority independently. The priority can be easily changed by a 2-bit identity without a separate message indicating a change in the quality of service. The priority of individual packets can be changed easily without first sending, for example, a message raising the priority and then, after the packet, a message lowering the priority.

When the quality of service changes and a separate message indicating the change is sent, it is not necessary to add a code indicating the quality of service to each separate packet. Another advantage achieved is simplification of billing, since a change in the quality of service, which is the billing criterion, is signalled by a separate message.

Packets destined to a mobile station do usually not have a mechanism for changing the quality of service during the session, so the quality of service is usually defined as the subscriber registers to use a GPRS connection.

Parameter Ki in FIG. 2 illustrates the amount of data sent from each queue at one go. As compared with prior art routing using a single queue, the service is improved if a plural number of queues Qi is used and parameter Ki is constant. The service can be further improved by adjusting parameter Ki, for example, on the basis of the quality of service such that more data is sent from the high-priority queues at one go than from the low-priority queues. Queue Q2 illustrates a situation where a small amount of data remains in the queue in addition to amount Ki. Transmission of entire queue Q2 here clearly improves the operation of the application concerned without that the other subscribers and/or applications would suffer too much. A suitable threshold value for such exceeding of Ki is, for example, 30 to 50%. Correspondingly, Q4 illustrates a queue comprising little data. Transmission of short queues before long ones shortens the average waiting time.

When packets are routed from a source to a destination, the nodes in between can use different queuing methods. For example, criteria optimized for an SGSN node may be different from those optimized for a GGSN node. In the present application, a packet network can be interpreted in the wide sense so that it comprises the base transceiver stations BTS and base station controllers BSC of a mobile system, in which the queuing mechanism provided by the invention can also be implemented.

The buffering and queue formation disclosed in the invention are described by way of an example in connection with a GPRS network node. Similar queues and buffers can naturally also be implemented at a base transceiver station BTS and/or a base station controller BSC of a mobile telephone network. It will be obvious to a person skilled in the art that as the technology develops, the basic idea of the invention can be implemented in many different ways. The invention and its embodiments are thus not limited to the above examples but can vary within the scope of the claims.

What is claimed is:

1. A method of routing packets in a packet network, the method comprising:

forming at least two queues at a node of the packet network and conducting a packet arriving at the node to a queue on the basis of at least one of the following criteria:

subscriber-specific criterion, such as
  subscriber identity;
  connection identity, such as TLLI;
  transport layer process, such as TCP process;
or
  service/quality-of-service-specific criterion, such as
    quality of service (QoS) of the subscriber receiving the packet;
    port of the TCP protocol of the application or application class;
and
transmitting a predefined number of packets from the queues at one go,
wherein all packets in a queue are transmitted if the transmitting a predefined number of packets from each queue at one go would leave a number of packets in the queue that is smaller than a predefined threshold value.

2. A method according to claim 1, wherein at least one criterion is a subscriber-specific criterion and that at least two queues are formed for a subscriber that has more than one simultaneous connection, the queues being separated on the basis of a service/quality-of-service-specific criterion.

3. A method according to claim 1, wherein at least one criterion is a subscriber-specific criterion and that a separate queue is formed for each simultaneous connection of a subscriber that has more than one simultaneous connection.

4. A method according to claim 1, wherein the number of packets sent from each queue per time unit is defined based on one or more of the following criteria:
  quality of service of the subscriber receiving the packet;
  quality of service of the application associated with the connection;
  amount of data in the queue concerned; and
  rate of the service previously offered to the queue concerned.

5. A method according to claim 4, wherein in queues with the highest quality of service, packets are sent as quickly as possible.

6. A method according to claim 4, further comprising:
  determining the rate of the service previously offered to the queue based on a moving average of the time that the packets are in the queue, and using the rate of the service to maintain the number of packets sent per time unit essentially the same at least for the queues with the same service/quality of service.

7. A method according to claim 1, wherein at least from the queues with the same service/quality of service, packets are sent so that over a long period of time each queue is given an equal amount of transmission time.

8. A method according to claim 1, wherein at least from the queues with the same service/quality of service, packets are sent so that over a long period of time an equal number of packets are sent from each queue.

9. A method according to claim 1, wherein the quality of service of the subscriber and/or application is signalled to the nodes located along the connection by providing each packet with an identity indicating the service/quality of service.

10. A method according to claim 1, wherein the service/quality of service of the subscriber and/or application is signalled to the nodes located along the connection by a separate message indicating a change in the service/quality of service.

11. A method according to claim 1, further comprising monitoring the time interval between two consecutive packets to ensure that it does not exceed, not even in a single queue, a threshold value of a delay that would make the application set down the connection.

12. A method according to claim 1, wherein the packet network is a GPRS network and the routing takes place at SGSN and/or GGSN nodes of the network.

13. A method according to claim 1, further comprising forming a queue at a base transceiver station (BTS) and/or base station controller (BSC) of a mobile system.

14. A method according to claim 1, wherein at least two different routing methods are used on a connection between a source and a destination of a packet.

15. A method according to claim 1, further comprising forming a separate queue for each subscriber that is currently being served.

16. A method according to claim 1, further comprising forming a separate queue for each connection of each subscriber that is currently being served.

* * * * *